United States Patent

[11] 3,581,993

| [72] | Inventor | Robert M. Reams<br>Route 2, Apex, N.C. 27502 |
|---|---|---|
| [21] | Appl. No. | 805,600 |
| [22] | Filed | Mar. 10, 1969 |
| [45] | Patented | June 1, 1971 |

[54] COMBINED HYDRAULIC CYLINDER AND VALVE FOR FOLDING AGRICULTURAL SPRAY BOOM AND THE LIKE
4 Claims, 9 Drawing Figs.

| [52] | U.S. Cl. | 239/167, 239/158, 239/168 |
|---|---|---|
| [51] | Int. Cl. | B05b 1/20, B67d 5/08, B05b 9/06 |
| [50] | Field of Search | 239/158, 161, 166, 167, 168; 91/402, 408, 409 |

[56] References Cited
UNITED STATES PATENTS

| 2,565,587 | 8/1951 | Boyett, Sr. | 239/168X |
| 3,002,497 | 10/1961 | Gulick et al. | 91/402 |
| 3,425,628 | 2/1969 | Reams | 239/168 |

Primary Examiner—Lloyd L. King
Assistant Examiner—Thomas C. Clup, Jr.
Attorney—B. B. Olive

ABSTRACT: A foldable agricultural spray boom incorporates a hydraulic cylinder which causes the boom to unfold when actuated by the pressurized spray liquid and in the unfolded position the cylinder acts as a valve by establishing a fluid path through the cylinder to the boom spray nozzles.

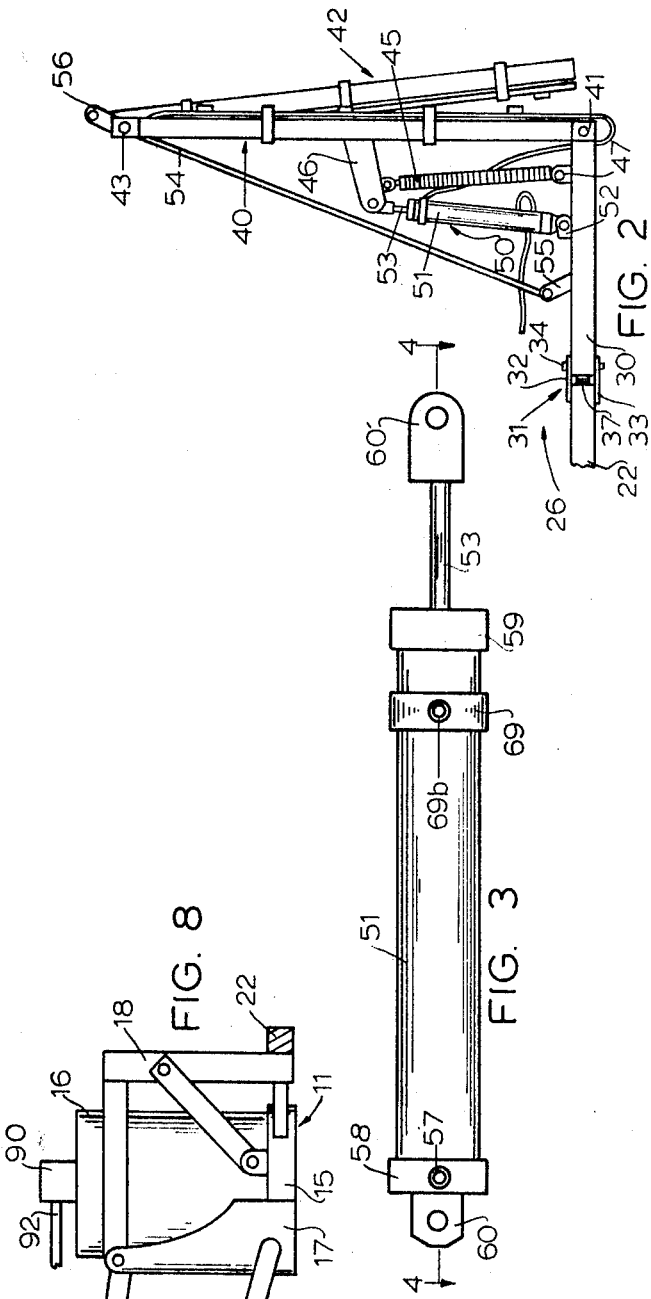
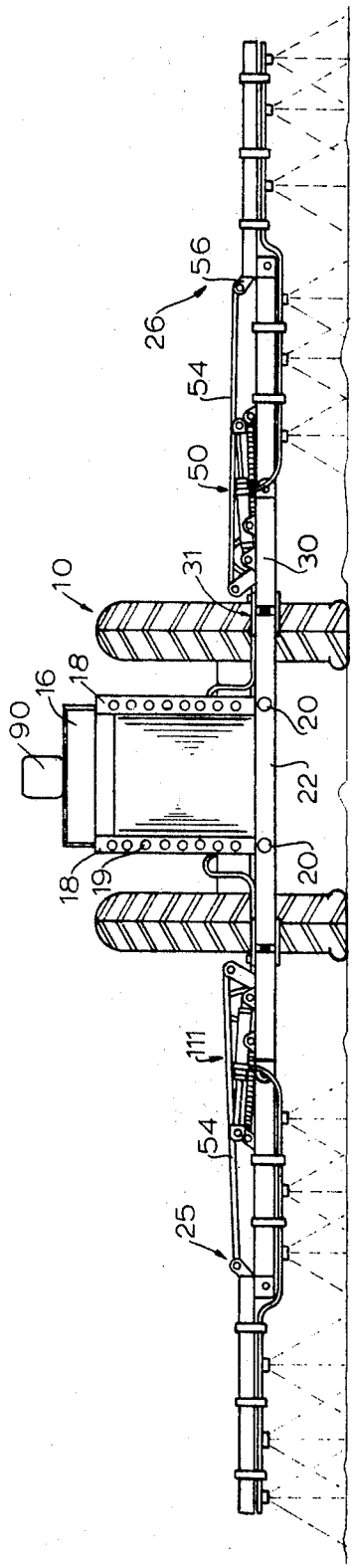
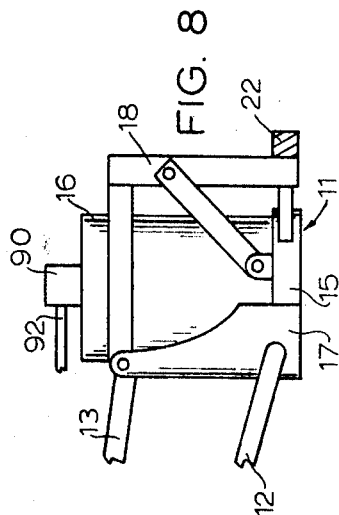
INVENTOR
Robert M. Reams
BY
ATTORNEY

PATENTED JUN 1 1971

INVENTOR
Robert M. Reams

BY
B. B. Olive
ATTORNEY 3,581,993

COMBINED HYDRAULIC CYLINDER AND VALVE FOR FOLDING AGRICULTURAL SPRAY BOOM AND THE LIKE

BACKGROUND OF THE INVENTION

1. Field of the Invention

The present invention relates to spraying apparatus which can be mounted on a tractor or the like and which uses a multisection foldable boom for the purpose of mounting the spray nozzles. The invention is more particularly directed to a hydraulic cylinder which is constructed in such a manner that it can be actuated by the pressurized spray liquid to unfold the boom and once the boom has been unfolded can act as a valve to open a liquid path for the spray liquid to reach the spray nozzles.

2. DESCRIPTION of the Prior Art

A history of the prior art which is generally applicable to the present invention is best given in my own prior U.S. Pat. No. 3,424,628 and to avoid repetition such summary is incorporated here by reference. Certain features of the apparatus which are described in that patent and which relate to the present invention will be mentioned. Of particular interest is the fact that in the prior patent each boom member mounts a hydraulic cylinder which receives the pressurized spray liquid and through various linkages described in the patent cause the outer boom section members to unfold to their operative horizontal position. Cutting off of the pressurized spray liquid to the hydraulic cylinder allows a spring member to return the boom member to its folded vertical position. Each time the boom member is unfolded from its vertical to its horizontal position and is ready to spray, the spray nozzles must be connected to the pressurized source of supply. However, it is necessary to prevent the spray liquid from being directed to the spray nozzles until the boom has reached its extended horizontal position.

In the apparatus of my prior patent control the spray liquid to the boom spray nozzles is obtained by means of a normally closed valve mounted on each respective boom and which is mechanically opened by the unfolding boom member. The valve thus opens a fluid path to the spray nozzles after the boom member reaches its fully extended horizontal position. Furthermore, folding of the boom acts to close the valve and shut off the liquid. From the foregoing it can be seen that according to the apparatus of the prior patent it was necessary to provide a hydraulic cylinder, a separate valve, and a valve actuator on each boom member for the purpose of actuating the boom member and for controlling flow of the spray liquid to the spray nozzles such that the liquid would flow but only after the boom member had reached its extended horizontal position and would be shut off when the boom folded. No suggestion or mention is made in the prior patent of constructing the hydraulic cylinder so that it can serve both as a boom actuating means and as a valve so as to eliminate the need for the separate valves and valve actuators on the respective boom members.

SUMMARY OF THE INVENTION

The general operation of the apparatus of the present invention is similar to the operation of the apparatus which is fully described and explained in my prior U.S. Pat. No. 3,425,628 and reference is made to such patent for detailed background information.

The present invention is directed to a hydraulic cylinder which is particularly useful with folding booms in agricultural spray apparatus of the type described in my prior patent. The cylinder of the invention could however find application in any field of use where a pressurized liquid is employed to actuate a cylinder and after actuation is diverted to other uses. More especially the hydraulic cylinder of the present invention is designed in such a way that it can receive the pressurized spray liquid and actuate the boom member so as to bring it into an unfolded, horizontal operational position and when in such horizontal position the cylinder acts as a valve for the purpose of opening up a liquid path through the cylinder to the spray nozzles mounted on the boom member. Furthermore, when the cylinder retracts and the boom is folded the cylinder acts like a valve and closes the path. Thus, the present invention eliminates the need for providing a separate valve on each boom member in that the hydraulic cylinder of the present invention acts both as a hydraulic cylinder and as a valve.

The object of the present invention can be said to be that of substantially simplifying and improving the operation of folding boom agricultural spring type apparatus.

DESCRIPTION OF THE DRAWINGS

FIG. 1 is a rear elevation view of an agricultural spraying machine constructed according to the invention and showing the boom members in a horizontal, spray position.

FIG. 2 is an enlarged elevation view of one of the articulated boom structures showing the same in a vertical, folded position.

FIG. 3 is an enlarged side elevation view of the hydraulic valve-cylinder of the invention.

FIG. 8 is a side elevation view of the platform and support means which are connected to the tractor.

DETAILED DESCRIPTION OF THE PREFERRED EMBODIMENT

Figure 4:
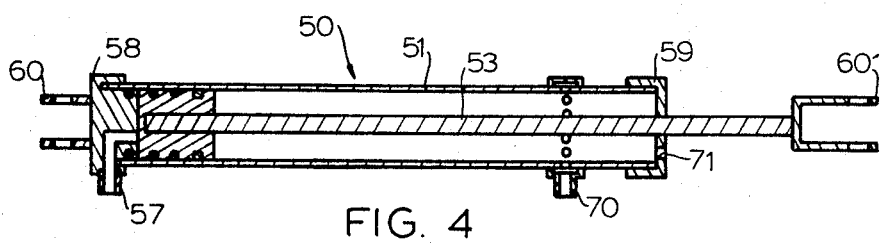
FIG. 4 is a section view taken along line 4–4 of FIG. 3 showing the valve cylinder in a retracted position corresponding to the boom member being folded.

Portions of the description to be found in my prior U.S. Pat. No. 3,425,628 are repeated here for an understanding of the invention. Tractor 10, which is representative of the prime movers to be used for transporting the apparatus of this invention, supports platform 11 by means of a conventional three-point lift or stabilized draw bar which include lift arms 12 and 13. Platform 11 is comprised of a floor 15, a front wall 17 and side support members 18. Floor 15 receives and supports drum 16 and front wall 17 and support members 18 position drum 16 laterally and prevent the same from becoming dislodged from platform 11. Support members 18 extend upwardly from floor 15 and are provided with openings 19. Bolts 20 are adapted to extend through a pair of aligned openings 19 and secure boom support bar 22 to support members 18. Boom support bar 22 is adapted to be moved vertically with respect to the ground by support arms 12 and 13 and also by being selectively positioned on support members 18. In effect, support members 18 and boom support bar 22 form a frame upon which articulated booms 25 and 26 may be mounted.

Articulated booms 25 and 26 are identical in structure and reference is made to FIG. 2 and boom 26 for the detailed description of the same. Boom support bar 22 is connected to intermediate bar 30 by means of a pivoting joint 31 which provides a vertical axis which allows the boom member to swing horizontally. Pivoting joint 31 as shown in FIG. 2 is comprised of a pair of spaced, horizontally disposed and parallel plates 32 and 33 which are rigidly mounted on boom support bar 22. Plates 32 and 33 receive a portion of one end of intermediate bar 30 which is pivotally mounted therein by means of pivot pin 34 which extends through plate 32, intermediate bar 30 and plate 33. It is desirable that the boom structure pivot only in the rearward direction and for such purpose intermediate bar 30 is provided with a limit bar, not shown here but shown in FIG. 6 of U.S. Pat. No. 3,425,628, which is adapted to engage plates 32 and 33 and to position intermediate bar 30 normally in axial alignment with boom support 22. Intermediate bar 30 is normally maintained in axial alignment with boom support 22 by means of a spring which is indicated at 37 and which is connected to intermediate bar 30 and to boom support bar 22. Therefore, when intermediate bar 30 and, resultingly, articulated boom member 25 are pivoted in the rearward direction, spring 37 is adapted to return intermediate bar 30 to a position whereby the limit bar maintains intermediate bar 30 in axial alignment with boom support bar 22. Articulated boom member 26 is comprised of a first boom section 40 which is mounted on intermediate bar 30 so as to pivot vertically by hinge pin 41 and a second boom section 42 which is pivotally connected to first boom section 40 by means of hinge pin 43. Spring 45 normally positions first boom section 40 perpendicularly with respect to intermediate bar 30 and is connected respectively thereto by means of post 46 and stake 47.

Figure 7:
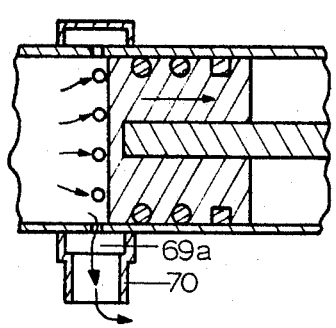
FIG. 7 is a view similar to FIGS. 5 and 6 and with the cylinder piston sufficiently advanced to open a path for the spray liquid to reach the spray nozzles.

While not shown it should be understood that boom members 25, 26 may be designed to swing in either direction horizontally as shown in FIGS. 7, 13 and 15 of my U.S. Pat. No. 3,425,628 and the same are incorporated by reference. Furthermore, while not shown the boom members may be constructed to fold in the horizontal rather than in the vertical plane. The invention furthermore adapts to a single section boom. For example, boom members 40 and 42 in FIG. 2 could be formed as a single section and shaft 54 eliminated. In such event the boom could be adapted to move vertically or horizontally for storage. For example, bar members 22 and 30 in FIG. 2 could be interpreted as being rigidly secured or formed as an integral member and attached to the tractor. Further, considering FIG. 2 as a plan view it can be seen that the invention readily adapts to horizontal folding.

Boom section 40 is pivoted downwardly and into a position of axial alignment with intermediate bar 30 by means of a fluid energized piston and valve cylinder 50. Valve cylinder 50 includes a housing or cylinder 51 which is pivotally mounted on intermediate bar 30 by means of brackets 60 which mate with stake 52 and piston rod 53 is pivotally connected to post 46 by brackets 60'. Upon the entrance of pressurized liquid into cylinder 51, piston rod 53 forces first boom section 40 outwardly and downwardly. Upon the downward pivoting movement of first boom section 40, second boom section 42 is pivoted relative first boom section 40 outwardly by shaft 54 which is connected to intermediate bar 30 and to second boom section 42 by means of stakes 55 and 56, respectively.

The description thus far repeats much of the description to be found in my prior U.S. Pat. No. 3,425,628 and which can be referred to for more details. It has been previously mentioned that the present invention is primarily directed to the construction of the valve cylinder 50 and particularly to the fact that valve cylinder 50 performs both a typical hydraulic cylinder actuating function, as in the prior patent, and additionally performs a valve function by way of controlling flow of the spray liquid to the spray nozzles. As best shown in FIGS. 4 through 7 it will be noticed that the cylinder 51 is closed by a pair of caps 58 and 59. Cap 58 has an inlet tube 57 through which the spray liquid is fed into cylinder 51. Piston 61 is provided with circular grooves 62 which receive O-rings 63 and a groove 66 which receives a U-cup 67 so as to provide an essentially snug sliding fit against the inner wall of cylinder 51. At least one but preferably a predetermined number of small holes 68 are spaced around the circumference of cylinder 51 and a collar 69 having a peripheral passage 69a mounts over the holes 68 so as to place holes 68 and the passage 69a in liquid communication. An output tube 70 connects to collar 69. An air breather and liquid pressure relief passage 71 is provided in cap 59.

Figure 5:
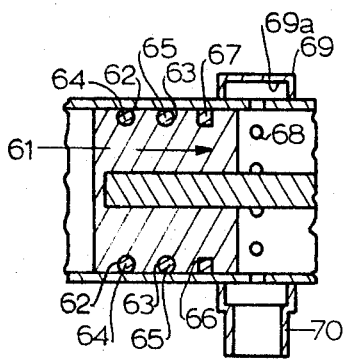
FIG. 5 is a fragmentary enlarged section view showing the cylinder piston in a partially extended position which blocks flow of the spray liquid to the spray nozzles.
Figure 6:
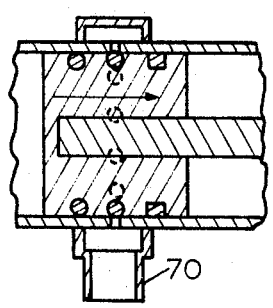
FIG. 6 is a view similar to that of FIG. 5 but with the cylinder piston further advanced but continuing to block the flow.

In operation the spray liquid enters cylinder 51 through inlet 57 and piston 61 is made to slide which in turn causes piston rod 53 to be extended in the direction indicated by the arrows. FIGS. 5, 6 and 7 illustrate the relationship of piston 61 in the final stages of its outward stroke. It will be noticed that no liquid can escape through perforations 68 and into passage 69a in the position shown in FIG. 5. In FIG. 6 piston 61 has moved to a position such that the perforations 68 are still sealed against passing liquids. In FIG. 7 the piston head 61 has moved past the perforations and in position shown in FIG. 7 liquid is allowed to escape through perforations 68, as indicated by arrows, into passage 69a and out the outlet 70 and in turn through the respective set of spray nozzles connected thereto (FIGS. 1 and 9).

Figure 9:
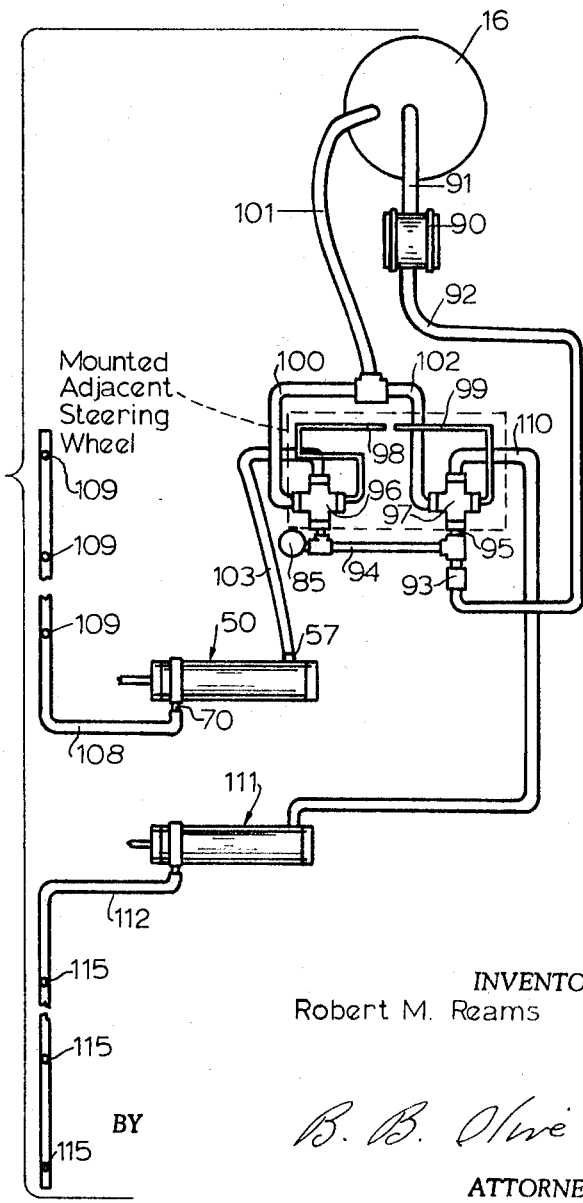
FIG. 9 is a schematic fluid flow diagram of the hydraulic system utilized in the apparatus of the invention.

In reference to the overall hydraulic system as shown in FIG. 9, drum 16 contains a liquid which may be water, a herbicide, a liquid fertilizer or the like. The liquid is withdrawn from drum 16 by means of a displacement pump 90 which is connected thereto by means of conduit 91. Pump 90 places the liquid under a positive pressure as it enters conduit 92. Conduit 92 is also provided with a check valve 93 which prevents the liquid from draining from conduit 92 which would result in pump 90 having to be primed after every stoppage thereof. Going forwardly, conduit 92 branches into conduits 94 and 95 which are respectively connected to directional valves 96 and 97, conduit 94 also being provided with a pressure gauge 85 for determining the pounds of pressure in the same. When pump 90 is in operation, the liquid flows through directional valves 96 and 97 continuously. Valve control handles 98 and 99 are located on the tractor adjacent the steering wheel so as to be available to the operator. The position of the handles 98 and 99 determine into which conduits the liquid is directed. As best shown in U.S. Pat. No. 3,425,628 handles 98,99 are located on the tractor near the operator. Conduit 100 leads the liquid away from directional valve 96 and into conduit 101 which directs the liquid back into drum 16 when handle 98 is in a vertically up and inoperative position. Likewise, conduit 102 directs the fluid into conduit 101 which empties the liquid into drum 16 when handle 99 is in a vertically up and inoperative position.

When handle 98 is pulled downwardly into a substantially horizontal position, the liquid is diverted from conduit 100 into conduit 103 which directs the same into valve cylinder 50 by way of inlet 57 and which actuates valve cylinder 50 as previously explained in connection with FIGS. 5, 6 and 7. In a similar manner valve cylinder 111 (FIG. 9) is actuated when handle 99 is pulled downwardly into a substantially horizontal position. When actuated the respective valve cylinders 50, 111 will of course cause the respective booms 25, 26 to unfold and as each respective piston rod 53 reaches the end of its stroke a path will be open, as best shown in FIG. 7, to the respective conduits 108, 112 and to the respective sets of spray nozzles 109, 115 (FIG. 9). Of course, the respective booms 25, 26 on each side of the tractor can be operated independently so that the operator can selectively spray on either one or both sides. Upon return of the respective handles 98, 99 to the respective vertical positions the respective valve cylinders 50, 111 will be relieved of pressure whereupon the respective springs 45 will cause the respective booms 25, 26 to fold and return to a vertical position.

In summary, it can be seen that the present invention retains all of the many advantages of the prior apparatus while at the same time eliminating the need for either a valve or valve actuator on the boom. Further, it can be seen that the cylinder valve of the invention has general application to other uses where a fluid medium can be used both for a primary actuating purpose and some secondary purpose, e.g., spraying.

I claim:

1. In a liquid spray apparatus for mounting on a tractor vehicle or the like of the type having a reservoir supported on the vehicle and containing a liquid to be sprayed, a pump connected to the reservoir to withdraw and pressurize the liquid, first and second booms pivotally mounted on the vehicle with each being adapted to swing independent of the other from a pivoted stored position adjacent the vehicle to an operative outwardly extending horizontal position, first and second sets of spray members carried by the respective first and second booms, first and second conduit means respectively connecting the spray members and pump, and first and second operator controlled valves mounted on the vehicle accessible to the operator and connected in the flow paths of the respective conduits to provide independent and selective control of liquid flow from the pump to the respective spray members, the improvement comprising:

a. first and second hydraulic cylinders mounted on said vehicle adjacent the respective booms and mechanically connected respectively to move said first and second booms between said stored and operative positions, each hydraulic cylinder being of the piston and cylinder type and being hydraulically connected so as to provide an internal flow path which continues the respective conduit means flow path and with an inlet connected to a respective valve and a cylinder wall opening connected through an outlet to a respective set of spray members, each said hydraulic cylinder being mechanically arranged such that the working face of its piston is adjacent its respective inlet when the respective valve is closed and the respective boom is in a stored folded position and when the respective valve is open the respective boom is opened to its unfolded horizontal position and the working face of the piston moves past the said outlet opening whereby the same pressurized liquid may be used simultaneously both as a hydraulic and spray liquid and the force of the pressurized liquid may simultaneously force flow of the liquid to the respective spray members and serve to maintain the respective boom in its unfolded position; and b. first and second return means mounted on said respective booms, each return means being adapted upon the closing of the respective valve and the relief of the force of said liquid to return the respective boom to said stored position.

2. In a liquid spray apparatus as claimed in claim 1, wherein each boom comprises a multisection boom which in said stored position folds vertically and each said respective hydraulic cylinder is mechanically connected to both unfold said respective multisection boom and move it to said operative position.

3. In the liquid spray apparatus as claimed in claim 2, including for each said hydraulic cylinder a plurality of annular sealing rings spaced on its piston and adapting its piston on an operative stroke to prevent the establishment of said internal flow path until the last then trailing said sealing ring has moved past said opening and on a return stroke to close such flow path upon the then leading said seal ring moving past said opening.

4. In a liquid spray apparatus as claimed in claim 3, wherein said return means comprises springs arranged to return said booms to the said stored position.